Oct. 4, 1955
W. L. STANLEY
2,719,755
ATOMIZING DEVICE
Filed Dec. 11, 1952
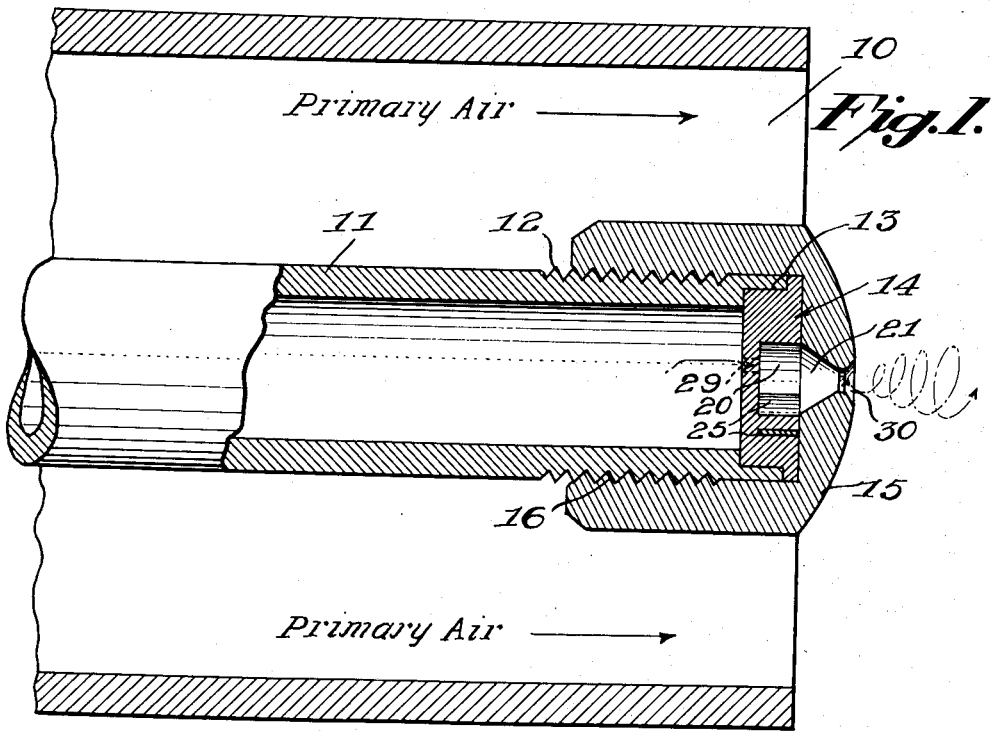
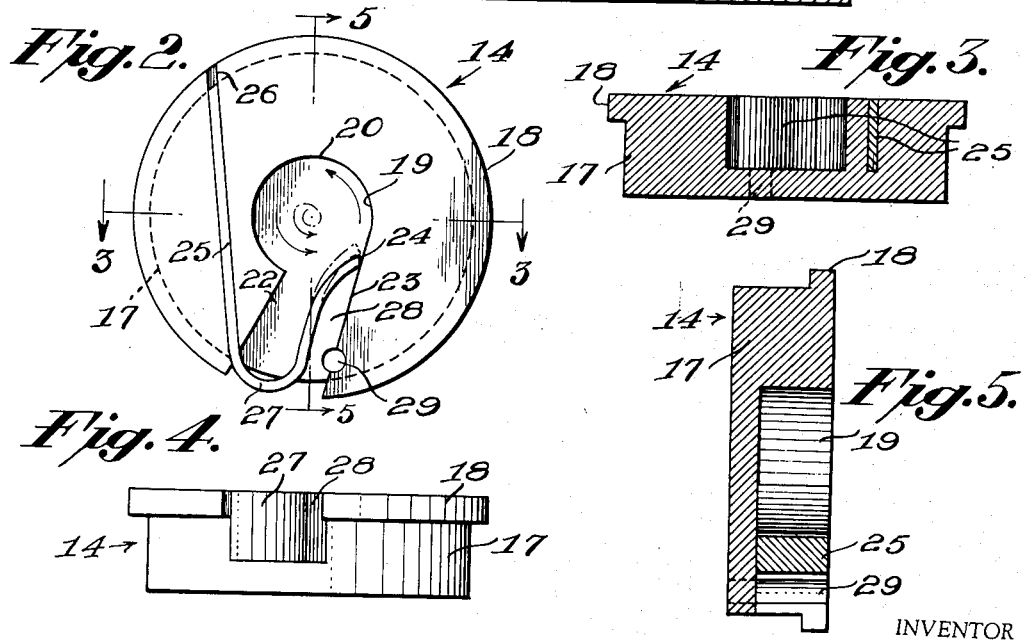
INVENTOR
William L. Stanley
BY
Robert C. Dennison
ATTORNEY United States Patent Office 2,719,755
Patented Oct. 4, 1955

2,719,755

ATOMIZING DEVICE

William L. Stanley, Woburn, Mass.

Application December 11, 1952, Serial No. 325,285

1 Claim. (Cl. 299—118)

This invention relates to improvements in an atomizing device of the fluid pressure type, whereby a large change of flow can be obtained with a minimum change in pressure.

In the usual fluid atomizing devices in which the orifices are fixed, the flow is in direct proportion to the square root of the pressure so that a reduction in pressure of approximately 50% will only reduce the flow approximately 30%.

Therefore, in practice the use of variable pressure to control fluid flow such as fuel oil, as in a fuel oil burner atomizer, a rather large change in pressure is necessary to control the flow. This great change in pressure reduces the velocity through the orifice to such an extent that the atomizing efficiency is severely reduced.

A primary object of this invention is to increase the variations in flow of fluid through an atomizing jet without reducing the effective atomizing pressure as in previous atomizing devices.

A further object of this invention is to allow a self-cleaning action in a jet orifice by allowing the increased pressure built up by the plugging material to automatically increase the size of the orifice thereby allowing the plugging material to pass through.

A still further object of the invention is to provide a fluid atomizing device including relatively few simple and sturdy parts whereby its efficient operation is assured over a relatively long period of time.

Other objects and advantages of the invention will become apparent in the course of the following detailed description, taken in connection with the accompanying drawing wherein—

Fig. 1 is a broken vertical sectional view in an axial plane of the oil supply pipe with portions of the pipe in elevation.

Fig. 2 is an end elevational view of the improved fluid flow control means.

Fig. 3 is a horizontal sectional view in the plane of line 3—3 on Fig. 2.

Fig. 4 is an edge view of the flow control means as observed from below Fig. 2.

Fig. 5 is a vertical sectional view in the plane of line 5—5 of Fig. 2.

Referring now in detail to the drawing—

The structure shown in Fig. 1 includes the end portion of an air supply tube 10 which in use extends into the furnace, and through which flows the primary air as indicated by legends thereon.

Extending coaxially within the tube 10 is an oil supply pipe 11 which adjacent its end is threaded as at 12 and the pipe is recessed at its free end as indicated at 13 for receiving the body portion of the improved fuel flow control member 14. The member 14 is removably retained within said recess 13 by means of a cup-shaped nut 15 whose skirt portion is internally threaded at 16 for cooperation with the threads 12 on the pipe 11.

The fuel flow control member is of circular form in end view and is of solid formation except for recesses therein later referred to.

The member 14 includes a body portion 17 and a circumferential flange 18 which as indicated in Fig. 1 laps the free end edge of the pipe 11. The body portion 17 is recessed inwardly from the flanged end thereof as indicated at 19 and such recess embodies a circular portion 20 coaxially of the body portion and which opens into a portion 22 which opens through the periphery of the body portion 17 and flange 18 and which portion 22 includes a wall 23 which is tangential to the circular recess portion 20 and which latter portion in the assembled position of the member 15 axially aligns with an opening 21 in the end portion of nut 15 and which opening is defined by a frusto-conical wall whose larger diameter coincides with that of the circular recess portion 20.

A leaf form spring is supported in the body portion 17 and includes a free end portion 24 normally engaging the recess wall 23 adjacent the junction of recess portions 20 and 22 and the spring further includes a relatively long shank portion 25 seated in a recess 26 in the body portion 17 and an intermediate outwardly convex portion 27 which projects outwardly of the open end of the recess portion 22.

The portion of the spring between its free end 24 and the convex portion 27 defines with wall 23 an orifice chamber 28 and a relatively small passageway 29 extends through the body portion 17 with substantially one half thereof being in wall 23 in the form of a trough.

In use of the structure above described and with the flow control member assembled as in Fig. 1, fluid in pipe 11 under variable pressure passes through passageway 29 into the orifice chamber 28.

Upon increase of pressure in the fluid, the free end 24 of the spring will be deflected from engagement with wall 23 as indicated by dotted lines in Fig. 2 which provides for an increased flow through the system due to the increased area between the spring end 24 and wall 23 as well as the increased velocity due to the increased pressure.

It may here be observed that the flow equals the velocity multiplied by the area.

The velocity is in proportion to the square root of the pressure and accordingly $$\text{Flow} = \sqrt{P} \times \text{area}$$

In the event that foreign matter plugs the orifice at 24, pressure will build up in chamber 28 and thereby deflect the spring sufficiently to permit discharge of such foreign material. On this occurrence the increased flow will cause the pressure to reduce automatically thereby allowing the orifice at 24 to return to its original area caused by the pressure prevailing before the plugging of the orifice.

The fluid upon passing through the orifice at 24 is caused to rotate or whirl within the recess portion 20 due to its initial impingement on the tangential wall 23 and the fluid will then pass through the opening 21 and finally through the discharge orifice 30 in nut 15 in the form of a conical spray.

While I have disclosed my invention in accordance with a single specific structural embodiment thereof, such is to be considered as illustrative only, and not restrictive, the scope of the invention being defined in the subjoined claim.

What I claim and desire to secure by U. S. Letters Patent is:

A fluid atomizing device comprising a fluid supply pipe, a fluid control head mounted on the discharge end of said pipe disposed and formed so as to restrict the fluid flow therefrom, said head comprising a unitary cylindrical member, the periphery of which fits into a bore in the mouth of said pipe, said head being formed at the outer side thereof with a central circular recess and a radial extension of said recess opening onto and toward the periphery of said head, there being a perforation formed through said head from the inner side to the outer side thereof at a point adjacent to the periphery of said head and partly intersecting a wall of said recess extension, a branched leaf spring, one branch thereof being disposed in said recess extension and yieldably closing off communication between said perforation and said central recess, the other branch of said spring being anchored in a slot in said outer side of the head; and a cap formed with a central opening and an inwardly flaring frusto conical extension thereof registering with said central recess, the interior wall of said cap closing said recess extension, and retaining said spring in said slot, the resiliency of said spring being of an amount chosen so as to yield to the pressure of the fluid so as to allow a relatively large change in flow under variations of fluid pressure.

References Cited in the file of this patent

UNITED STATES PATENTS

| | | |
|---|---|---|
| 1,114,664 | Yarrow | Oct. 20, 1914 |
| 1,326,488 | Fisher | Dec. 30, 1919 |
| 1,439,320 | Morse | Dec. 19, 1922 |
| 1,504,981 | Selfridge | Aug. 12, 1924 |
| 1,822,047 | Leask | Sept. 8, 1931 |
| 2,083,282 | Thompson | June 8, 1937 |
| 2,503,481 | Hallinan | Apr. 11, 1950 |

FOREIGN PATENTS

| | | |
|---|---|---|
| 415,274 | Great Britain | Aug. 23, 1934 |
| 636,685 | Great Britain | May 3, 1950 |